(12) United States Patent
Morimoto et al.

(10) Patent No.: US 8,343,683 B2
(45) Date of Patent: Jan. 1, 2013

(54) FUEL CELL STACK

(75) Inventors: Go Morimoto, Wako (JP); Tadashi Nishiyama, Wako (JP); Hiroyuki Tanaka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 23 days.

(21) Appl. No.: 12/944,723

(22) Filed: Nov. 12, 2010

(65) Prior Publication Data
US 2011/0143251 A1 Jun. 16, 2011

(30) Foreign Application Priority Data

Dec. 11, 2009 (JP) ................................ 2009-281632

(51) Int. Cl.
*H01M 8/24* (2006.01)
*H01M 8/10* (2006.01)
*H01M 2/14* (2006.01)

(52) U.S. Cl. ........ 429/470; 429/467; 429/483; 429/507; 429/511

(58) Field of Classification Search .................. 429/470, 429/467, 483, 507, 511
See application file for complete search history.

(56) References Cited

U.S. PATENT DOCUMENTS 6,645,659 B2 * 11/2003 Bisaka et al. ................ 429/454
2009/0317688 A1 12/2009 Inagaki

FOREIGN PATENT DOCUMENTS

| JP | 2005-142042 | 6/2005 |
| WO | PCT/JP2007/069532 | * 5/2008 |

* cited by examiner

*Primary Examiner* — Helen O Conley
(74) *Attorney, Agent, or Firm* — Ditthavong Mori & Steiner, P.C.

(57) ABSTRACT

A fuel cell stack including a plurality of fuel cells each formed by stacking separators and an electrolyte membrane-electrode assembly. The electrolyte membrane-electrode assembly includes an electrolyte membrane provided with a pair of electrodes on the opposite sides thereof. A stacked body formed by stacking the fuel cells is provided with a pair of end plates at the opposite ends thereof in a stacking direction. The end plates are integrally fixed by fastening members with the distance between the end plates maintained. A load measurement mechanism including a plurality of load sensors integrally connected to a connector member is provided between one of the end plates and the stacked body. The one of the end plates is provided with a pressure mechanism. The pressure mechanism presses the load measurement mechanism toward the stacked body to thereby apply a tightening load to the stacked body via the load sensors.

12 Claims, 6 Drawing Sheets

BACKGROUND ART

FUEL CELL STACK

CROSS-REFERENCE TO RELATED APPLICATIONS

The present application claims priority under 35 U.S.C. §119 to Japanese Patent Application No. 2009-281632, filed on Dec. 11, 2009, entitled "Fuel Cell Stack." The contents of this application are incorporated herein by reference in their entirety.

BACKGROUND OF THE INVENTION

1. Field of the Invention

The present invention relates to a fuel cell stack.

2. Description of the Related Art

For example, a solid polymer fuel cell includes a unit cell in which separators hold therebetween an electrolyte membrane-electrode assembly (MEA) that includes an electrolyte membrane formed by a polymer ion exchange membrane and provided with an anode-side electrode and a cathode-side electrode on the opposite sides thereof. This type of fuel cell is normally used as an in-vehicle fuel cell stack and the like, with a predetermined number of the unit cells stacked.

This type of fuel cell stack needs to be applied with a favorable tightening load in the stacking direction to obtain desired power generation performance and exert the sealing function.

In view of the above, a fuel cell stack and tightening method thereof disclosed by Japanese Unexamined Patent Application Publication No. 2005-142042 is known, for example, which intends to obtain uniform pressure distribution in the entire surface of each of the unit cells. According to Japanese Unexamined Patent Application Publication No. 2005-142042, as illustrated in FIG. 6, an end plate 3a, fuel cell constituent members 4, and an end plate 3b are stacked in the vertical direction on a stacking table 2 forming a pressure device 1. The end plates 3a and 3b are temporarily tightened by a few tie-rod bolts 5 placed therebetween.

The pressure device 1 includes a plurality of pressure cylinders 7, the pressure force of which is adjusted by the pressure supplied by pressure force control devices 6. Each of the pressure cylinders 7 is provided with a pressing block 8 at the leading end thereof, and the pressing block 8 is provided with a load cell 9 on a pressing surface thereof.

Herein, after the respective pressure forces of the pressure cylinders 7 uniformly reach zero torque, the respective pressures of all of the pressure cylinders 7 start to be increased. Further, the respective pressure forces input by the load cells 9 are monitored. If all of the pressure forces reach a preset pressure force value, all of the pressure force control devices 6 stop increasing the pressure. Then, the tie-rod bolts 5 are sequentially tightened, and thereafter the pressure force applied by the pressure device 1 is released.

According to Japanese Unexamined Patent Application Publication No. 2005-142042, the respective pressure forces obtained from the load cells 9 are monitored to obtain a uniformly pressurized state in the surface of each of the cells. Thereafter, the tie-rod bolts 5 are tightened, while the pressure force of the pressure device 1 is released. Depending on the tightened state of the tie-rod bolts 5, therefore, the uniformly pressurized state may fail to be maintained in the entire surface of each of the cells.

Further, the fuel cell stack needs to be subjected to a further tightening process (increased tightening) in the stacking direction to compensate for a reduction in tightening load with the lapse of time of use. In this case, according to Japanese Unexamined Patent Application Publication No. 2005-142042, the fuel cell stack again needs to be set in the pressure device 1, subjected to the pressure force applying process by the pressure force control devices 6, and thereafter subjected to the tightening process using the tie-rod bolts 5.

As a result, an issue arises in that the pressure distribution in the surface of each of the cells tends to vary in the retightening process using the tie-rod bolts 5 and thus a high-performance and favorable increased tightening process fails to be carried out.

SUMMARY OF THE INVENTION

According to one aspect of the present invention, a fuel cell stack includes a plurality of fuel cells. The plurality of fuel cells each are formed by stacking separators and an electrolyte membrane-electrode assembly. The electrolyte membrane-electrode assembly includes an electrolyte membrane provided with a pair of electrodes on the opposite sides thereof. A stacked body formed by stacking the plurality of fuel cells is provided with a pair of end plates at the opposite ends thereof in a stacking direction. The pair of end plates are integrally fixed by fastening members with the distance between the end plates maintained. A load measurement mechanism including a plurality of load sensors integrally connected to a connector member is provided between one of the end plates and the stacked body. The one of the end plates is provided with a pressure mechanism. The pressure mechanism presses the load measurement mechanism toward the stacked body to thereby apply a tightening load to the stacked body via the plurality of load sensors.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
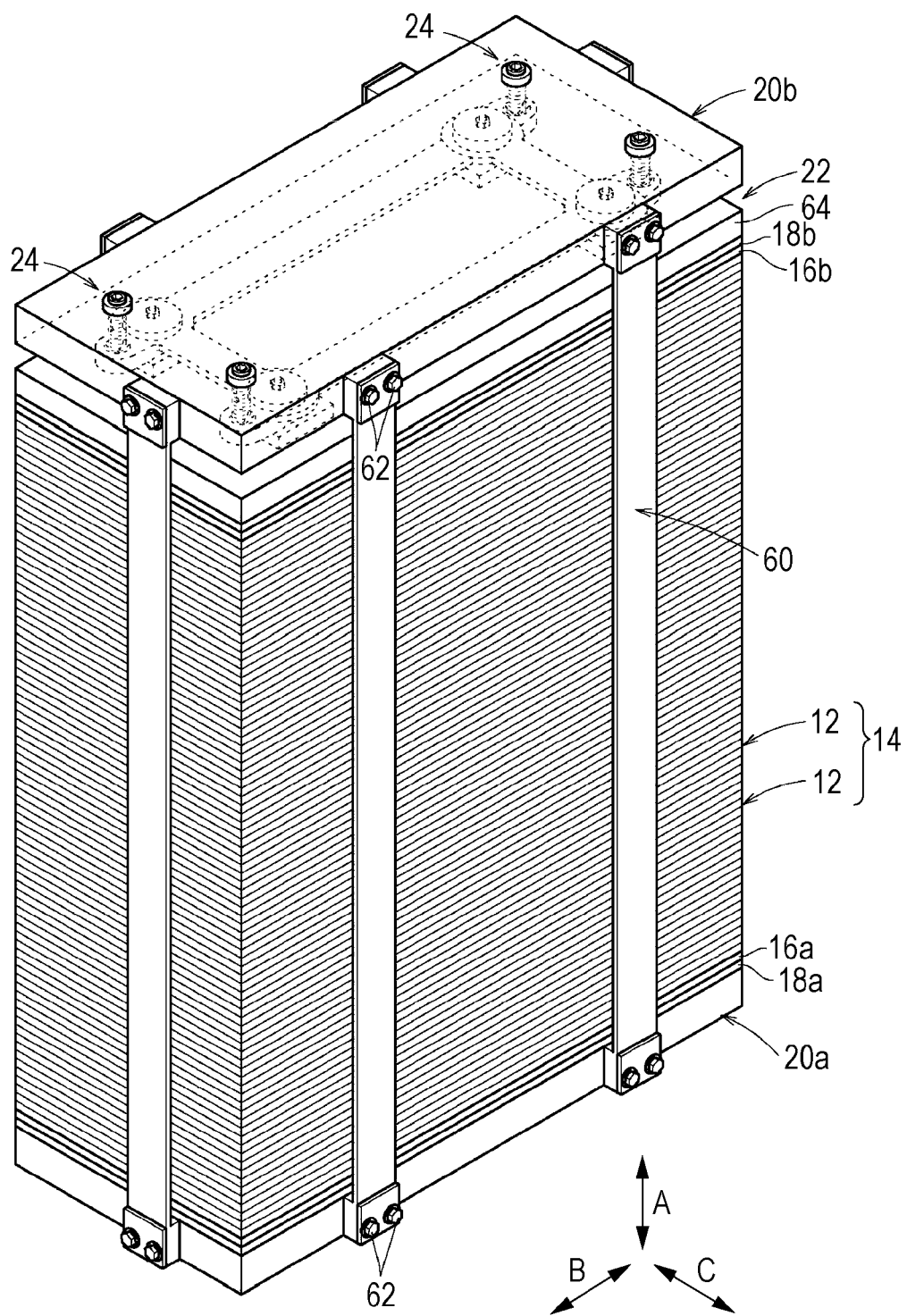
FIG. 1 is an explanatory diagram illustrating a schematic perspective view of a fuel cell stack according to a first embodiment of the present invention.

The embodiments will now be described with reference to the accompanying drawings, wherein like reference numerals designate corresponding or identical elements throughout the various drawings.

As illustrated in FIG. 1, a fuel cell stack 10 according to a first embodiment of the present invention includes a stacked body 14 formed by a plurality of fuel cells 12 stacked in the direction of an arrow A (vertical direction). At the lower end (one end) of the stacked body 14 in the stacking direction, a first terminal plate 16a, a first insulating plate 18a, and a first end plate 20a are stacked.

Figure 2:
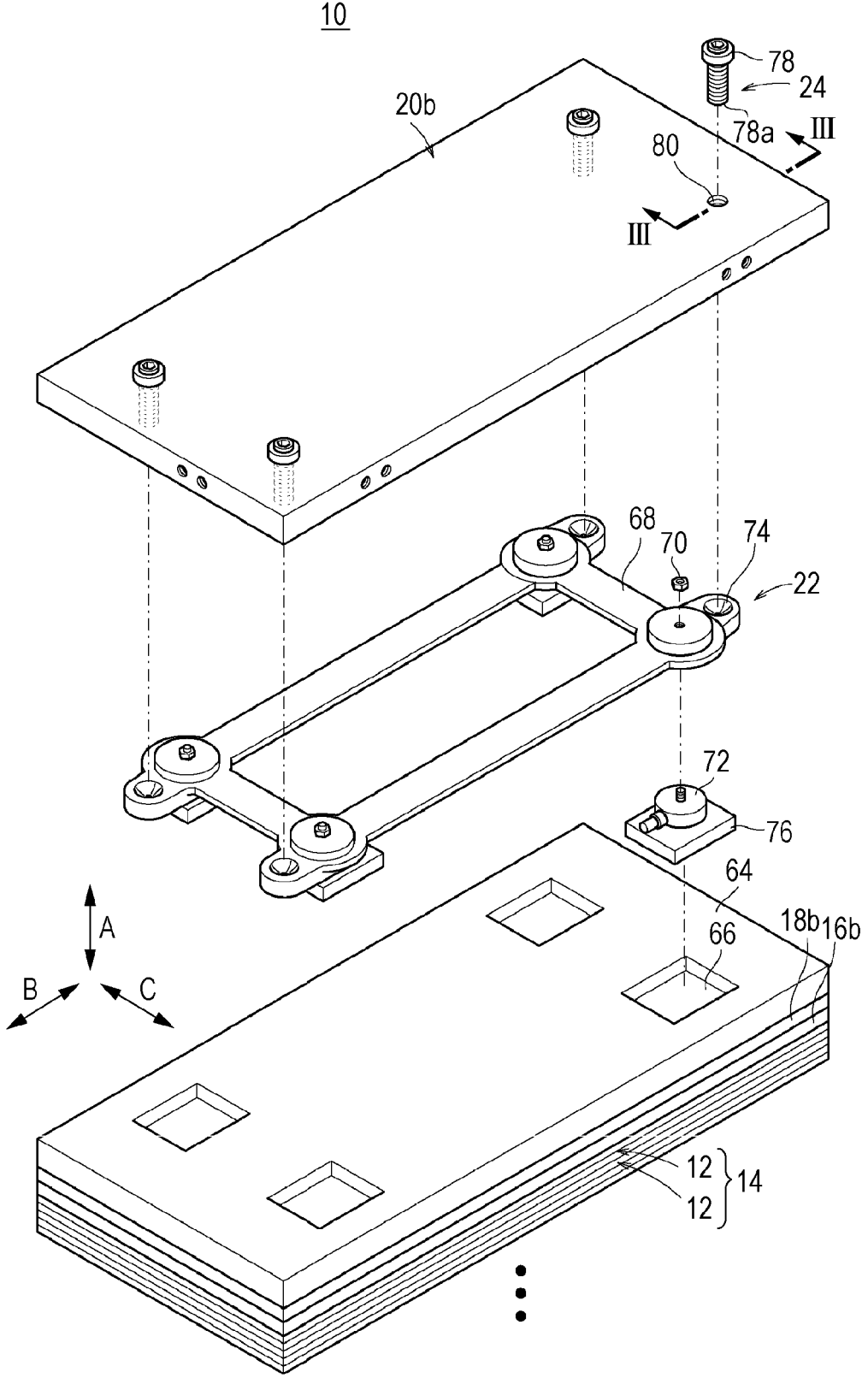
FIG. 2 is an explanatory diagram illustrating a perspective exploded view of essential parts of the fuel cell stack.
Figure 3:
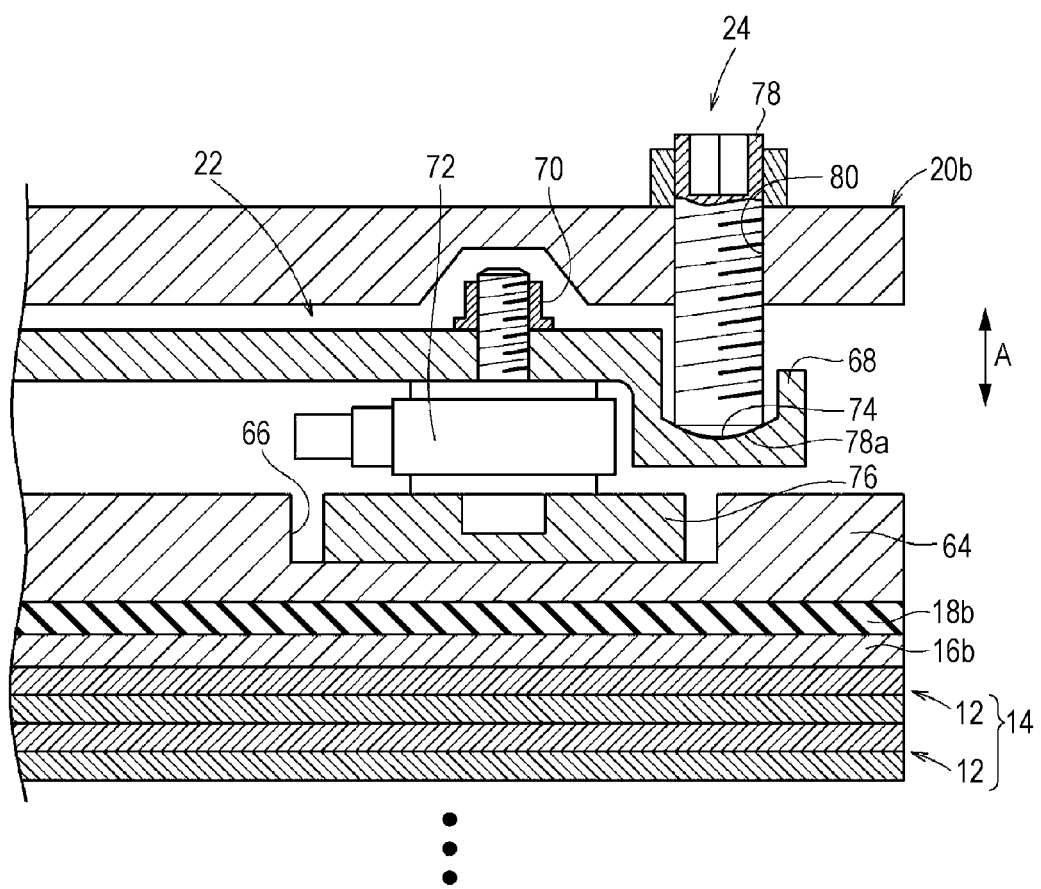
FIG. 3 is a cross-sectional view of the fuel cell stack taken along the line III-III in FIG. 2.

As illustrated in FIGS. 2 and 3, at the upper end (the other end) of the stacked body 14 in the stacking direction, a second terminal plate 16b, a second insulating plate 18b, a load measurement mechanism 22, and a second end plate (one of the end plates) 20b are stacked. The second end plate 20b is provided with a pressure mechanism 24. The stacked body 14 may be formed by the plurality of fuel cells 12 stacked in the horizontal direction (direction of an arrow B or C).

Figure 4:
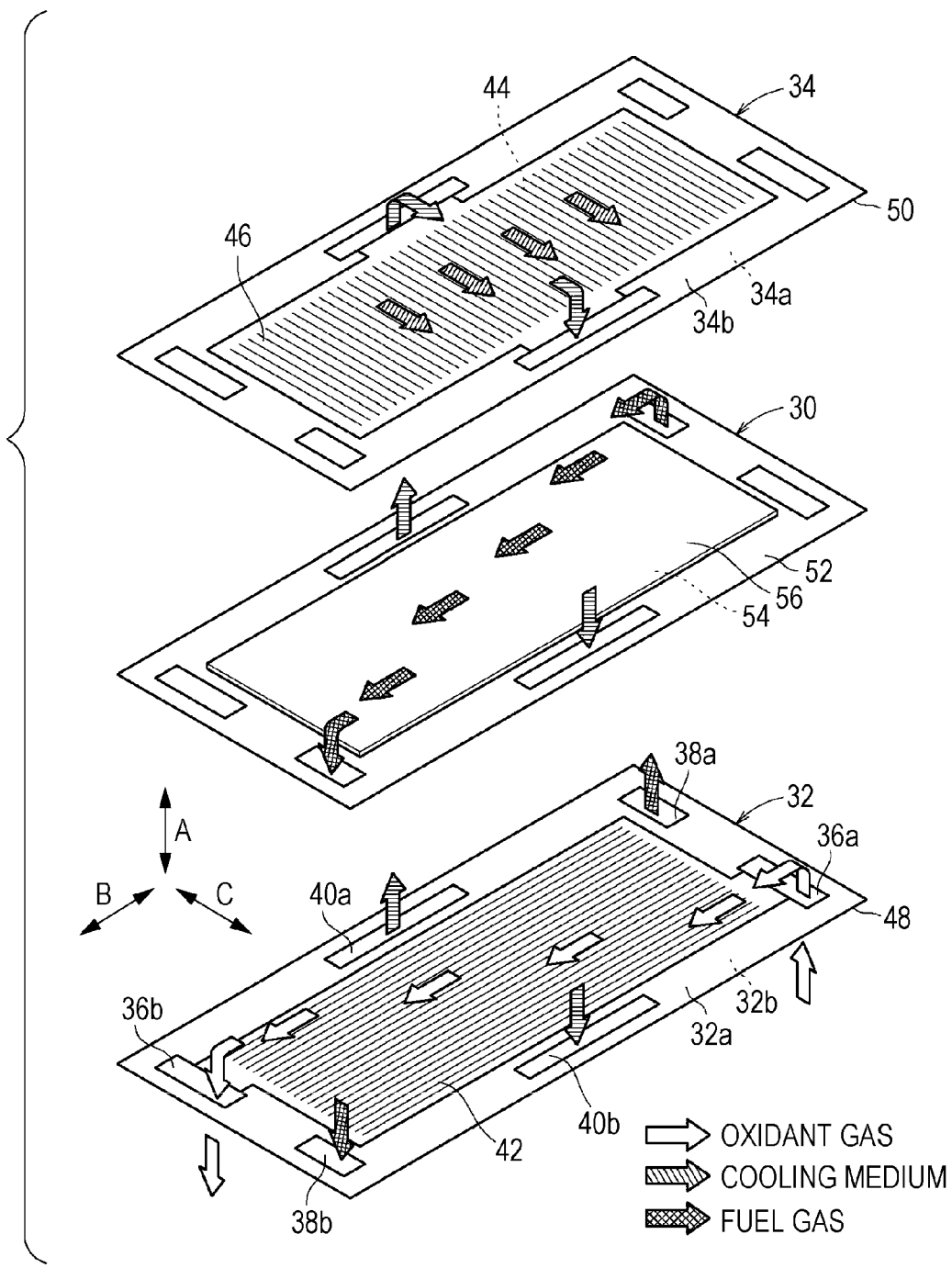
FIG. 4 is an explanatory diagram illustrating a perspective exploded view of essential parts of a fuel cell forming the fuel cell stack.

As illustrated in FIG. 4, in each of the fuel cells 12, an electrolyte membrane-electrode assembly 30 is held between first and second separators 32 and 34. Each of the first and second separators 32 and 34 is formed by a carbon separator or a metal separator, such as a steel plate, a stainless steel plate, an aluminum plate, or a plated steel plate, for example.

One end edge portion of the fuel cell 12 in the direction of the arrow B (horizontal direction in FIG. 4) is provided with an oxidant gas inlet communication hole 36a for supplying an oxidant gas, e.g., an oxygen-containing gas, and a fuel gas inlet communication hole 38a for supplying a fuel gas, e.g., a hydrogen-containing gas, with the communication holes communicating in the direction of the arrow A corresponding to the stacking direction and arranged in the direction of the arrow C (horizontal direction).

The other end edge portion of the fuel cell 12 in the direction of the arrow B is provided with a fuel gas outlet communication hole 38b for discharging the fuel gas and an oxidant gas outlet communication hole 36b for discharging the oxidant gas, with the communication holes communicating in the direction of the arrow A and arranged in the direction of the arrow C.

Opposite end edge portions of the fuel cell 12 in the direction of the arrow C are provided with a cooling medium inlet communication hole 40a for supplying a cooling medium and a cooling medium outlet communication hole 40b for discharging the cooling medium.

A surface 32a of the first separator 32 facing the electrolyte membrane-electrode assembly 30 is provided with an oxidant gas flow channel 42 communicating with the oxidant gas inlet communication hole 36a and the oxidant gas outlet communication hole 36b.

A surface 34a of the second separator 34 facing the electrolyte membrane-electrode assembly 30 is provided with a fuel gas flow channel 44 communicating with the fuel gas inlet communication hole 38a and the fuel gas outlet communication hole 38b.

Between a surface 32b of the first separator 32 forming one fuel cell 12 and a surface 34b of the second separator 34 forming another fuel cell 12 adjacent to the one fuel cell 12, a cooling medium flow channel 46 is provided which communicates with the cooling medium inlet communication hole 40a and the cooling medium outlet communication hole 40b.

The surfaces 32a and 32b of the first separator 32 are integrally or separately provided with a first sealing member 48, and the surfaces 34a and 34b of the second separator 34 are integrally or separately provided with a second sealing member 50.

The first and second sealing members 48 and 50 use a sealing material, a cushion material, or a packing material, such as EPDM (Ethylene Propylene Diene Monomer), NBR (Nitrile Butadiene Rubber), fluororubber, silicone rubber, fluorosilicone rubber, butyl rubber, natural rubber, styrene rubber, chloroprene, or acrylic rubber, for example.

The electrolyte membrane-electrode assembly 30 includes a solid polymer electrolyte membrane 52 formed by, for example, a perfluorosulfonic acid thin film impregnated with water, and a cathode-side electrode 54 and an anode-side electrode 56 holding therebetween the solid polymer electrolyte membrane 52.

Each of the cathode-side electrode 54 and the anode-side electrode 56 includes a gas diffusion layer formed by carbon paper or the like and an electrode catalyst layer formed by porous carbon particles having platinum alloy supported on the surface thereof and uniformly coated over the surface of the gas diffusion layer. The electrode catalyst layer is formed on both surfaces of the solid polymer electrolyte membrane 52.

As illustrated in FIG. 1, a plurality of connector bars 60 extend between the first and second end plates 20a and 20b, which are made of aluminum, for example. Thereby, the distance between the first and second end plates 20a and 20b is kept constant. Each of the connector bars 60 is, for example, made of aluminum and formed into an elongated plate shape. Two of the connector bars 60 are provided on each of the longer sides of the fuel cell stack 10, and one of the connector bars 60 is provided on each of the shorter sides of the fuel cell stack 10. The connector bars 60 are fixed to side portions of the first and second end plates 20a and 20b with screws 62.

The first end plate 20a is provided with a manifold (not illustrated) communicating with the oxidant gas inlet communication hole 36a, the fuel gas inlet communication hole 38a, the cooling medium inlet communication hole 40a, the oxidant gas outlet communication hole 36b, the fuel gas outlet communication hole 38b, and the cooling medium outlet communication hole 40b, and extending to the outside. Meanwhile, the second end plate 20b is formed into a flat plate shape not including the above-described components and sealing members.

As illustrated in FIGS. 2 and 3, the load measurement mechanism 22 includes a pressure plate 64 placed on the second insulating plate 18b. The pressure plate 64 includes rectangular recesses 66 formed in the vicinity of the four corners thereof. The load measurement mechanism 22 includes a frame-like connector member 68 and load sensors, e.g., load cells 72, which are fixed to the four corners of the connector member 68 with nuts 70.

The connector member 68 includes spherical recesses 74 each provided in the vicinity of the corresponding one of the load cells 72 and having a spherical bottom surface. The load cells 72 are attached with respective pressing members 76, and the pressing members 76 are placed in the respective recesses 66 of the pressure plate 64.

The pressure mechanism 24 includes a plurality, e.g., four, of load adjustment bolts 78. The load adjustment bolts 78 are screwed into screw holes 80 formed in the second end plate 20b, and respective spherical leading end portions 78a thereof are placed in the respective spherical recesses 74 of the connector member 68. The center of each of the load adjustment bolts 78 and the center of the corresponding load cell 72 deviate from each other.

The operation of the thus configured fuel cell stack 10 will be described below.

As illustrated in FIG. 4, the oxidant gas inlet communication hole 36a and the fuel gas inlet communication hole 38a are first supplied with an oxidant gas such as an oxygen-containing gas and a fuel gas such as a hydrogen-containing gas, respectively. Further, the cooling medium inlet communication hole 40a is supplied with a cooling medium such as pure water, ethylene glycol, or oil.

Thereby, the oxidant gas is introduced from the oxidant gas inlet communication hole 36a into the oxidant gas flow channel 42 of the first separator 32. While moving in the direction of the arrow B, the oxidant gas is supplied to the cathode-side electrode 54 forming the electrolyte membrane-electrode assembly 30.

Meanwhile, the fuel gas is introduced from the fuel gas inlet communication hole 38*a* into the fuel gas flow channel 44 of the second separator 34. While moving in the direction of the arrow B, the fuel gas is supplied to the anode-side electrode 56 forming the electrolyte membrane-electrode assembly 30.

In the electrolyte membrane-electrode assembly 30, therefore, the oxidant gas supplied to the cathode-side electrode 54 and the fuel gas supplied to the anode-side electrode 56 are consumed by electrochemical reaction in the electrode catalyst layers. Thereby, power generation is performed.

Then, the oxidant gas supplied to and consumed by the cathode-side electrode 54 is discharged in the direction of the arrow A through the oxidant gas outlet communication hole 36*b*. Meanwhile, the fuel gas supplied to and consumed by the anode-side electrode 56 is discharged in the direction of the arrow A through the fuel gas outlet communication hole 38*b*.

Further, the cooling medium supplied to the cooling medium inlet communication hole 40*a* is introduced into the cooling medium flow channel 46 between the first and second separators 32 and 34, and thereafter circulates in the direction of the arrow C. The cooling medium cools the electrolyte membrane-electrode assembly 30, and thereafter is discharged from the cooling medium outlet communication hole 40*b*.

In this case, the fuel cell stack 10 has previously been applied with an initial load in the stack assembly process. Then, with the lapse of time of use of the fuel cell stack 10 for power generation, internal sealing members, e.g., the first and second sealing members 48 and 50, the solid polymer electrolyte membranes (carbon paper) 52, and the like tend to wear out due to shrinkage thereof.

In this state, the first and second end plates 20*a* and 20*b* are fixed by the plurality of connector bars 60 in the fuel cell stack 10, with the distance between the end plates kept constant. With the lapse of time of use, therefore, the tightening load on the fuel cell stack 10 is reduced.

In the first embodiment, therefore, the load measurement mechanism 22 including the plurality of load cells 72 integrally connected to the connector member 68 is provided between the second end plate 20*b* and the stacked body 14. Further, the second end plate 20*b* is provided with the pressure mechanism 24 which presses the connector member 68 to thereby apply a tightening load to the stacked body 14 via the plurality of load cells 72.

As illustrated in FIG. 3, therefore, as the load adjustment bolts 78 forming the pressure mechanism 24 are screwed into the respective screw holes 80 of the second end plate 20*b*, the spherical leading end portions 78*a* of the load adjustment bolts 78 press the respective bottom surfaces of the spherical recesses 74 of the connector member 68 toward the stacked body 14.

Therefore, the load cells 72 attached to the connector member 68 to be in the vicinity of the respective load adjustment bolts 78 press the pressure plate 64 toward the stacked body 14 via the pressing members 76. Thereby, the stacked body 14 is applied with the tightening load via the pressure plate 64.

With the increased tightening of the load adjustment bolts 78 performed as described above, the load cells 72 placed in the vicinity of the respective load adjustment bolts 78 apply the tightening load to the stacked body 14 via the pressure plate 64. Accordingly, the load cells 72 are capable of accurately detecting the value of the increased tightening load, while applying the increased tightening load to the stacked body 14.

The above configuration has, therefore, an advantage of allowing accurate detection of the load distribution in a surface of the stacked body 14, and thus allowing the pressure mechanism 24 to easily and reliably adjust the tightening load such that the load applied to the stacked body 14 is uniformly distributed in the surface of the stacked body 14.

Further, the total amount of tightening load applied to the stacked body 14 is detectable from the sum of respective tightening loads detected by the load cells 72. Accordingly, a highly accurate increased fastening process is carried out with a simple configuration.

Further, the load measurement mechanism 22 is interposed between the second end plate 20*b* and the stacked body 14. It is therefore possible to detect the load distribution during the power generation by the fuel cell stack 10, and to easily detect whether or not the load distribution in the fuel cell stack 10 is appropriate.

Furthermore, if the detected load is input to a not-illustrated control unit (ECU: Electronic Control Unit), it is possible to effectively use the detected load for the control of a variety of operating conditions, and to improve the power generation performance.

Figure 5:
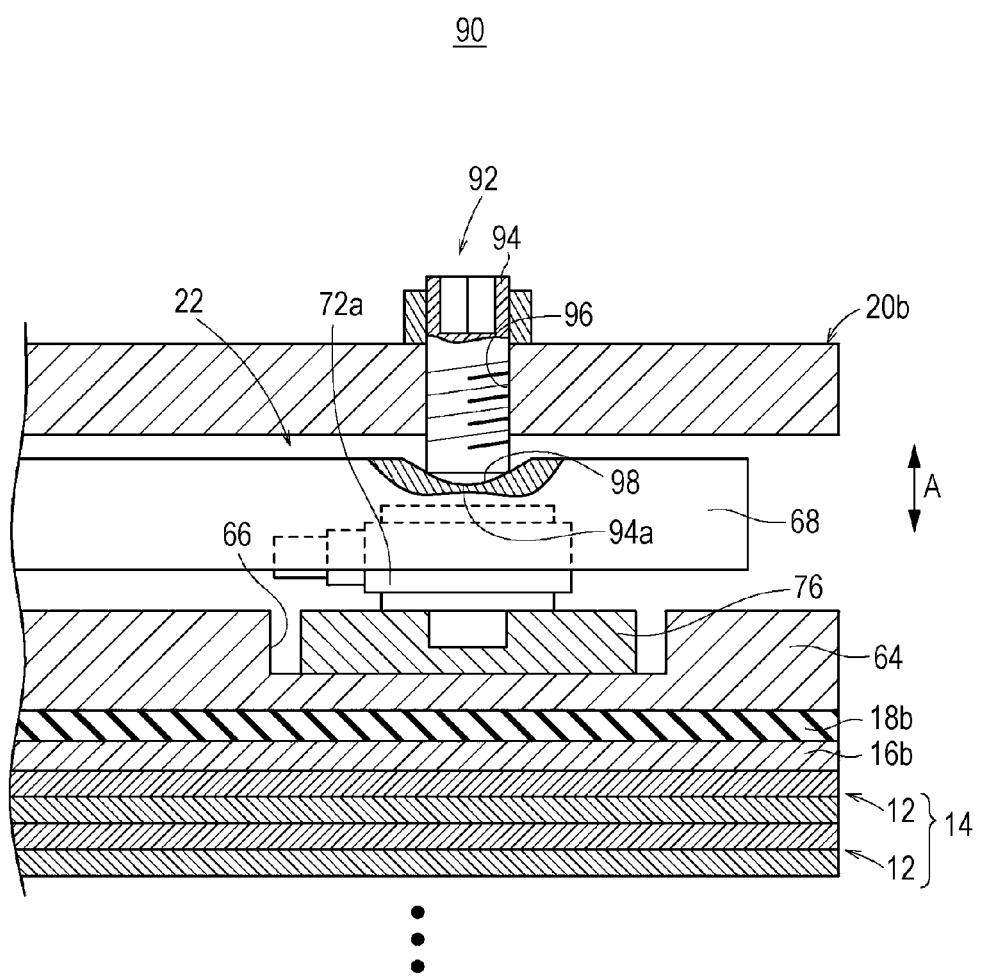
FIG. 5 is an explanatory diagram illustrating a cross-sectional view of essential parts of a fuel cell stack according to a second embodiment of the present invention.
Figure 6:
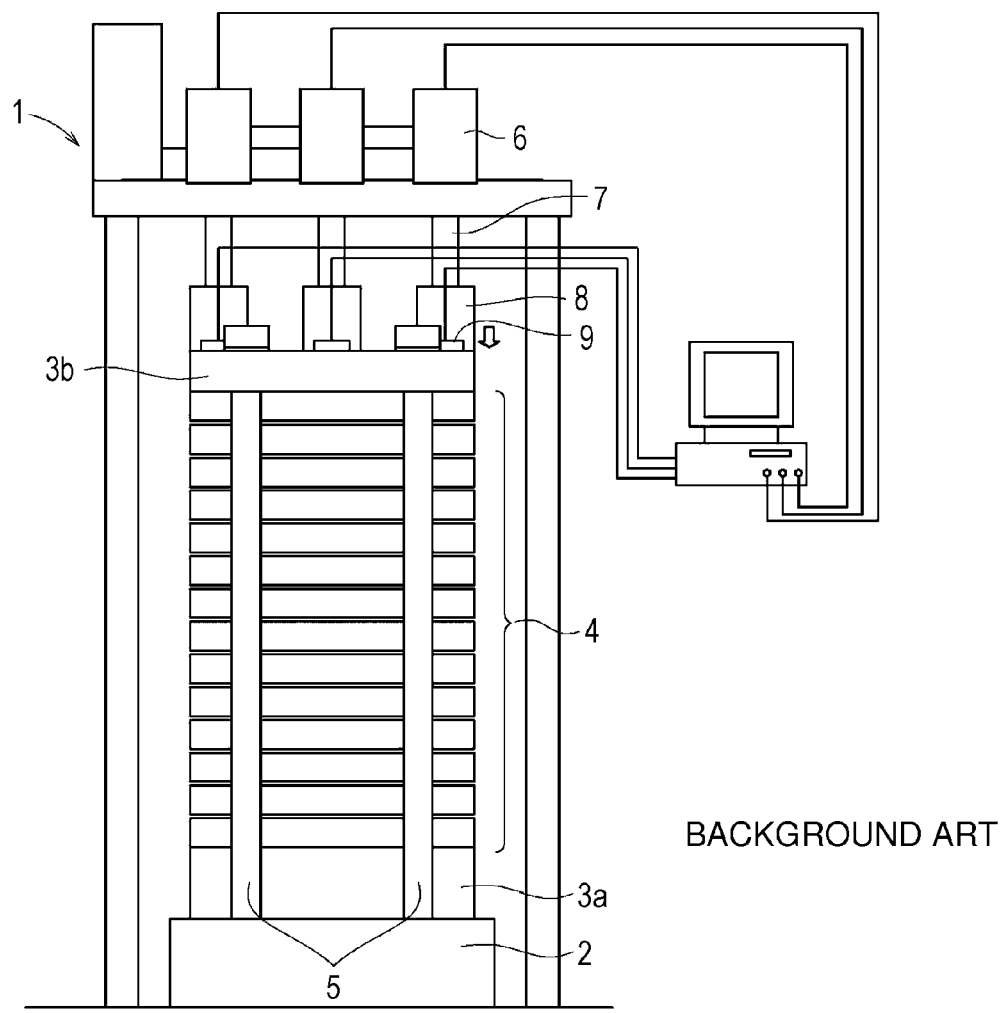
FIG. 6 is an explanatory diagram of a related art fuel cell stack.

FIG. 5 is an explanatory diagram illustrating a cross-sectional view of essential parts of a fuel cell stack 90 according to a second embodiment of the present invention. The same components as the components of the fuel cell stack 10 according to the first embodiment will be assigned with the same reference numerals, and detailed description thereof will be omitted.

The fuel cell stack 90 includes a pressure mechanism 92 which includes a plurality of load adjustment bolts 94. The load measurement mechanism 22 is provided with a plurality of load cells 72*a*, and the second end plate 20*b* includes screw holes 96 formed therein to be coaxial with the respective load cells 72*a*.

Each of the load adjustment bolts 94 is screwed into the corresponding screw hole 96, and thereby is located at a position coaxial with the corresponding load cell 72*a*. Each of the load adjustment bolts 94 is provided with a spherical leading end portion 94*a* at the leading end thereof, and the connector member 68 includes spherical recesses 98 formed therein.

In the thus configured second embodiment, each of the load adjustment bolts 94 forming the pressure mechanism 92 presses the connector member 68 coaxially with the corresponding load cell 72*a*. The respective increased tightening loads applied by the load adjustment bolts 94 are, therefore, directly transmitted to the respective load cells 72*a*. Consequently, the present configuration has an advantage of more directly transmitting to the stacked body 14 the increased tightening loads applied by the load adjustment bolts 94.

Further, the moment due to the increased tightening loads applied by the load adjustment bolts 94 does not act on the connector member 68. Therefore, the rigidity of the connector member 68 is easily enhanced.

In the first and second embodiments, the first and second end plates 20*a* and 20*b* are fixed by the plurality of connector bars 60. The configuration, however, is not limited thereto. For example, the first and second end plates 21*a* and 20*b* may be formed as end plates provided with panels on side portions thereof, to thereby form the entire configuration into a casing shape.

Further, each of the load cells 72 or 72*a* is provided with the load adjustment bolt 78 or 94. The configuration, however, is not limited thereto. For example, with the provision of load adjustment bolts, each of which integrally applies a load to two of the load cells 72 or 72a, it is possible to halve the number of the load adjustment bolts.

According to the embodiment of the present invention, the pressure mechanism may preferably include a plurality of load adjustment bolts which are screwed into respective screw holes provided in the one of the end plates.

Further, each of the load adjustment bolts may preferably be placed in the connector member at a position in the vicinity of the corresponding one of the load sensors.

Furthermore, each of the load adjustment bolts may preferably be placed in the connector member at a position coaxial with the corresponding one of the load sensors.

According to the embodiment of the present invention, with the load measurement mechanism pressed toward the stacked body by the pressure mechanism, it is possible to apply a tightening load to the stacked body via the plurality of load sensors forming the load measurement mechanism. Consequently, the plurality of load sensors are capable of reliably applying an optimal tightening load to the fuel cell stack while accurately detecting the tightening load.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell stack comprising:
   a plurality of fuel cells each formed by stacking separators and an electrolyte membrane-electrode assembly including an electrolyte membrane provided with a pair of electrodes on the opposite sides of the electrolyte membrane,
   wherein a stacked body formed by stacking the plurality of fuel cells is provided with a pair of end plates at the opposite ends of the stacked body in a stacking direction,
   wherein the pair of end plates are integrally fixed by fastening members with the distance between the end plates maintained,
   wherein a load measurement mechanism including a plurality of load sensors integrally connected to a connector member is provided between one of the end plates and the stacked body,
   wherein the one of the end plates is provided with a pressure mechanism which presses the load measurement mechanism toward the stacked body to thereby apply a tightening load to the stacked body via the plurality of load sensors, and
   wherein the pressure mechanism comprises a plurality of load adjustment bolts which are screwed into respective threaded screw holes provided in the one of the end plates.

2. The fuel cell stack according to claim 1, wherein each of the load adjustment bolts is placed in the connector member at a position in the vicinity of the corresponding one of the load sensors.

3. The fuel cell stack according to claim 1, wherein each of the load adjustment bolts is placed in the connector member at a position coaxial with the corresponding one of the load sensors.

4. The fuel cell stack according to claim 1, wherein each of the load adjustment bolts is screwed into the corresponding screw hole in the stacking direction and presses the connector member of the load measurement mechanism toward the stacked body.

5. The fuel cell stack according to claim 4, wherein the load measurement mechanism comprises:
   pressing members attached to the respective load sensors; and
   a pressure plate including recesses in which the respective pressing members are provided, the pressure plate being provided between the connector member and the stacked body.

6. The fuel cell stack according to claim 1, wherein the connector member is a frame-shaped member having a load sensor of the plurality of load sensors connected to each corner of the frame-shaped member.

7. The fuel cell stack according to claim 6, wherein each corner of the frame-shaped member further includes a spherical recess configured to receive a respective load adjustment bolt of the plurality of load adjustment bolts.

8. The fuel cell stack according to claim 7, wherein each load sensor of the plurality of load sensors is threadably mounted to each corner of the frame-shaped member.

9. The fuel cell stack according to claim 7, wherein each load sensor of the plurality of load sensors is mounted to the frame-shaped member at a position coaxial with the respective load adjustment bolt of the plurality of load adjustment bolts.

10. The fuel cell stack according to claim 1, wherein the plurality of load sensors are seated on a surface of the connector member such that the plurality of load sensors is positioned in between the connector member and the stacked body.

11. The fuel cell stack according to claim 10, wherein the plurality of load adjustment bolts are configured to press against an opposite surface of the connector member from the surface of the connector member upon which the plurality of load sensors are seated.

12. The fuel cell stack according to claim 11, wherein the load measurement mechanism further comprises:
   pressing members each being attached to a respective load sensor of the plurality of load sensors; and
   a pressure plate including recesses in which the respective pressing members are provided, the pressure plate being provided between the connector member and the stacked body.

* * * * *